United States Patent Office 3,211,050
Patented Oct. 12, 1965

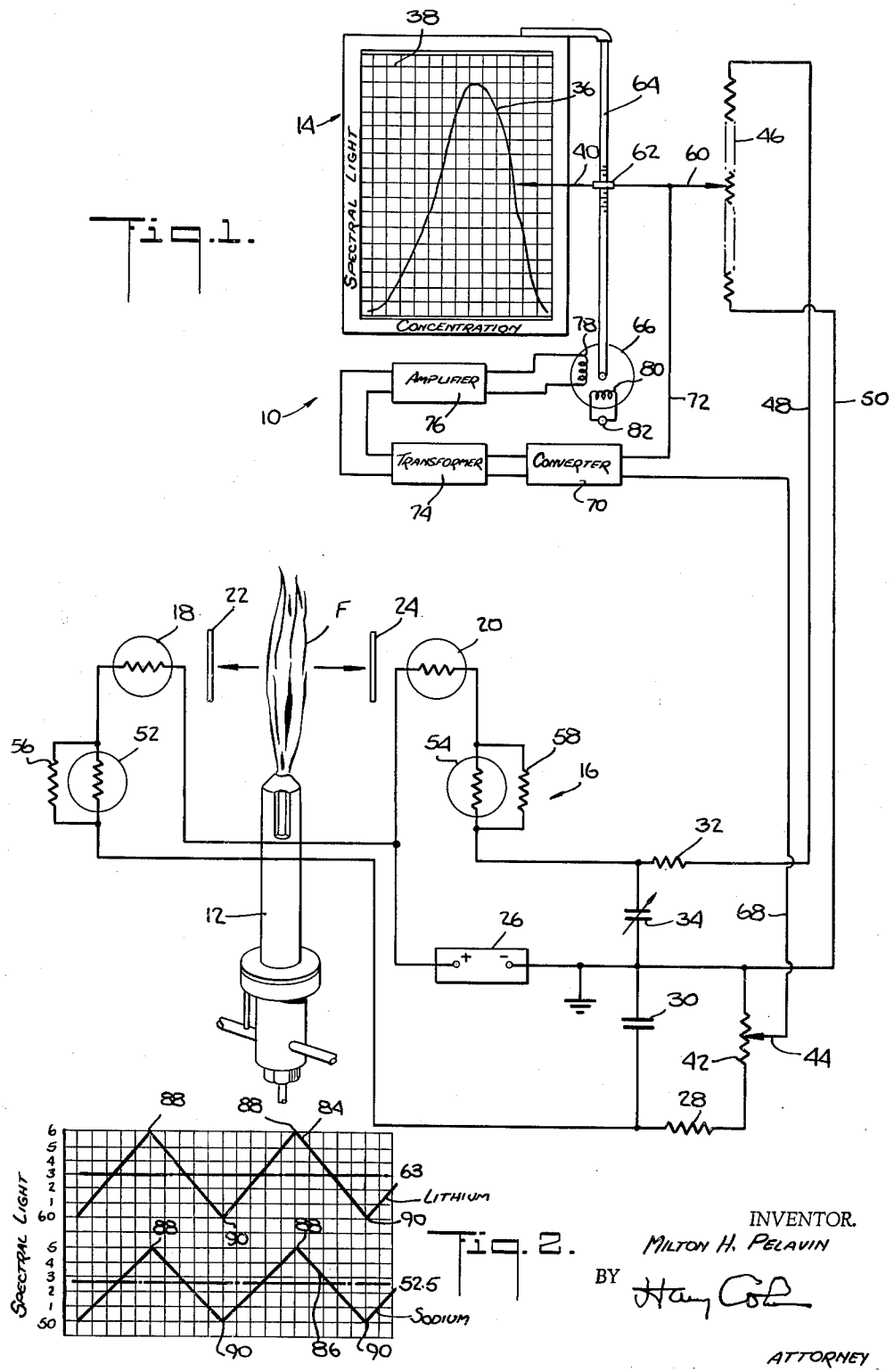

3,211,050
RECORDING SPECTRAL-FLAME PHOTOMETER
APPARATUS AND METHOD
Milton H. Pelavin, Greenburgh, N.Y., assignor to Technicon Instruments Corporation, Chauncey, N.Y., a corporation of New York
Filed July 3, 1961, Ser. No. 121,667
9 Claims. (Cl. 88—14)

This invention relates to analysis and recording apparatus and, more particularly, to the control system of a spectral-flame analysis and recording apparatus for measuring and recording quantitatively the results of the spectral analysis of a substance which is introduced into the flame of a spectral-burner of the apparatus to determine the quantity of an element present in the substance.

The recording spectral-flame photometer apparatus of this invention may be used for the quantitative analysis of various liquids in respect to one or more substances therein, for example, and without limitation, the analysis of blood serum for sodium or potassium or for both of these substances. In such analysis, lithium chloride or other suitable substance is added to the sample blood serum to provide the sample with an internal standard or reference. When the sample containing the lithium chloride is introduced into the flame of the burner, a quantitative determination of the sodium, for example, is obtained by transmitting the spectral light corresponding to the spectral line of the sodium to a photosensitive device or light detector to provide a current which is proportional to the amount of said spectral light, and spectral light corresponding to the spectral line of the lithium is simultaneously transmitted to another photosensitive device to provide another current which is proportional to the amount of said spectral light corresponding to the lithium spectral line. A recorder, operable under the control of a null-type balance current ratio system, records the ratio of the currents as a measure of the quantity of the sodium present in the blood serum.

In apparatus of the above-indicated type, false peaks and depressions in the record of the spectral analysis of the sample sometimes occurs due to the "noise" of the burner flame, which interferes with accurate reading of the recordings. In accordance with the primary object of the invention, the current ratio system of the apparatus is provided with means which nullifies the effect of said "noise" so that the resulting record has few, if any, false peaks and depressions.

The above and other objects, features and advantages of the invention will be fully understood from the following description of the presently preferred embodiment of the invention considered with reference to the accompanying illustrative drawings.

In the drawings:

FIG. 1 is a combined circuit diagram and diagrammatic view of a spectral-flame analysis and recording photometer apparatus illustrating the method and apparatus of the invention; and FIG. 2 illustrates spectral analysis curves utilized in the explanation of the apparatus of FIG. 1.

Referring now to the drawings in detail and first to FIG. 1, the recording spectral-flame photometer apparatus 10 comprises a spectral-burner 12 and a recorder 14 operable under the control of a null-type balance current ratio system 16. Spectral light corresponding to the spectral line of the element with respect to which the sample is being analyzed is transmitted to the photosensitive device or detector 18 and spectral light corresponding to the spectral line of the internal standard which is introduced into the sample is transmitted to the companion photosensitive device or detector 20. Filter 22 is provided in the path of light from the flame F to photosensitive device 18 and passes light corresponding only to the spectral line of the element under analysis and filter 24 is provided between the light from the flame and photosensitive device 20 and passes light corresponding only to the spectral line of the internal standard. The photosensitive devices are preferably cadmium sulfide photoconductive cells which are well known devices and do not require further description. Each of the photosensitive devices is energized by a regulated constant voltage power supply 26 and the current caused to flow in the circuit of each photosensitive device is proportional to the spectral light received by the respective photosensitive device.

In circuit with photosensitive device 18 is a resistance 28 and capacitance 30 and in circuit with photosensitive device 20 is a resistance 32 and a variable capacitance 34. In accordance with the invention, as will be more fully understood hereinafter, capacitance 34 is adjusted to a value which nullifies the effect of false peaks and depressions of the currents in the respective photosensitive circuits which occur due to the operation of the spectral-flame burner and which result in false peaks and depressions in the record 36 formed on the chart paper 38 of the recorder 14 by the stylus 40. Resistances 28 and 32 are employed in order to reduce the sizes of capacitors 30 and 34, respectively, to practical sizes. The circuit for photosensitive device 18 is provided with a load resistance 42 and an adjustable tap 44 for said resistance. The slide wire potentiometer 46 of the recorder is connected in the circuit of photosensitive device 20, via leads 48 and 50.

Provision is made for neutralizing the change in resistance in photosensitive devices 18 and 20 due to variations in ambient temperature. More particularly, the resistance of the photosensitive devices decreases with increases in the light to which the devices are exposed but the resistance increases with increases in temperature. The ambient temperature effect on the resistance of a device is neutralized by the provision of the thermistors 52 and 54 in series with the devices 18 and 20, respectively, in temperature equalizing relation therewith. The thermistors 52 and 54 are provided, if necessary, with trimming resistances 56 and 58 in shunt with said thermistors, respectively, to match or reduce the differences in temperature-resistance characteristics of the thermistor and its corresponding photosensitive device.

The recorder 14 is of the well known self-balancing slide wire type, as previously indicated. The movable tap 60 of the potentiometer 46 is movable in unison with the stylus 40 of the recorder and both are connected to the nut 62 which is moved longitudinally of threaded rotary rod 64 which is driven by the two-phase motor 66. It will be understood that nut 62 is held against rotation and rod 64 is held against longitudinal movement so that when it is rotated by motor 66, the nut 62 is moved longitudinally for the balancing operation of tap 60 and the concomitant movement of stylus 40, said movement of the stylus providing the recording 36 on the chart 38 of the recorder.

As is well known to those skilled in the art, the response of photosensitive device 18 to the spectral light varies the current flow through the device and provides a current flow through resistance 42 which produces a voltage drop across said resistance and a portion of said voltage is supplied by tap 44 and lead 68 to a converter 70. Similarly, the response of photosensitive device 20 to the spectral light varies the current flow through the device and provides a current flow through the resistance 32 and the slide wire potentiometer 46 of the recorder and it will be noted that said slide wire is connected in the circuit of the photosensitive device for the internal standard. Tap 60 of the slide wire potentiometer 46 is connected to convertor 70 by lead 72, so that the voltage difference between tap 60 and tap 44 is applied to the convertor. The convertor changes the D.C. voltage into an A.C. voltage and the A.C. voltage output of the convertor is applied to the transformer 74, amplified by the amplifier 76, and applied to the winding 78 of the two-phase motor 66. The other winding of the two-phase motor is energized by an A.C. source indicated at 82. The motor 66 operates in response to the voltage difference between taps 60 and 44 to drive tap 60 of the potentiometer to balance the system at which point there is no voltage applied to convertor 70. The movement of the stylus 40 during the balancing operation makes a record on the chart of the recorder which is the ratio of the current responses of the photosensitive devices and is a measure of the quantity of the element present in the substance being analyzed.

The "noise" nullifying effect of capacitance 34 can best be understood with reference to FIG. 2 which shows a portion of a curve or recording 84, on a greatly enlarged scale, of a spectral-flame analysis of a sample with respect to lithium only and a curve or recording 86, on the same scale as curve 84, of a spectral-flame analysis of a sample with respect to sodium only, for example. These curves may be obtained by operating the apparatus "single-ended" in lieu of the usual "double-ended" analysis operation of the apparatus wherein both the lithium and sodium content of the sample are simultaneously measured and compared with respect to each other.

The photosensitive device responsive to the lithium content of the sample is by-passed and concomitantly non-photosensitive electric means is substituted to provide a current for the reference side, which includes the slide wire 46, for controlling the operation of the recorder with the apparatus being operated "single-ended" so that a curve 86 representing the sodium content of the sample is formed and this curve is formed without any influence from the lithium content of the sample. For obtaining the curve 84 for the lithium content, in the "single-ended" operation of the recorder, a non-photosensitive electric means is employed to provide a current for the reference side and the sample side of the circuit is made responsive to the spectral light of the lithium. In both cases the recorder shows the ratio of spectral light from the sample to a fixed voltage substituted in the reference side of the circuit. Since "single-ended" and "double-ended" operation of a spectral-flame photometer apparatus are well known and do not per se form part of the present invention, a further description of these operations is unnecessary. If further information is desired, recourse may be had to my copending application Serial No. 77,352 filed December 21, 1960, now Patent No. 3,031,915, and assigned to the assignee of the present application.

Examination of curves 84 and 86 indicates that the "noise" provides peaks 88 and depressions 90 in the curves which represent an A.C. variation in the average D.C. value of the currents flowing through the respective circuits of the photosensitive devices 18 and 20. The effect of these A.C. peak-to-peak variations can be reduced or entirely eliminated by adjusting the value of capacitance 34 so that the ratio of the A.C. peak-to-peak value to the average D.C. value of the currents flowing in the respective circuits of the photosensitive devices are the same and similar variations are thereby eliminated in the resulting curves provided by the recorder during analysis when the apparatus is operated "double-ended." More particularly, as indicated in FIG. 2, capacitance 34 has been adjusted to a value whereby the ratio of the A.C. peak-to-peak value of 6, in the case of lithium curve 84, to the average D.C. value of 63 is 9.52 percent. In the case of the sodium curve 86, the ratio of the A.C. peak-to-peak value of 5 to the average D.C. value of 52.5 is also 9.52 percent so that the ratios of the A.C. peak-to-peak value to the average D.C. value of both curves are the same and the effect of "noise" from the burner flame is nullified during normal "double-ended" analysis operation of the apparatus and the recording of the analysis does not have false peaks and depressions.

While the apparatus has been described with a variable capacitance 34, it will be understood that either capacitance 30 or 34 can be made adjustable and the other capacitance can be a fixed value. Either capacitance 30 or 34 can be varied so that the ratio of the A.C. peak-to-peak value to the average D.C. value of each curve is the same. It will also be understood that both capacitances 30 and 34 can be fixed and one of them can be provided with a trimming capacitance for obtaining the correct capacitance value to obtain the same ratios for both curves.

For further information with respect to the spectral-flame photometer apparatus reference may be had to my copending application Serial No. 853,076 filed November 16, 1959, now abandoned, and assigned to the assignee hereof.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

I claim:

1. A method of spectral-flame analysis of a liquid containing a substance and an internal standard as constituents thereof, said method comprising the steps of introducing said liquid into said flame, deriving a first quantity of light representative of the quantity of said substance in said liquid, deriving a second quantity of light representative of the quantity of said internal standard in said liquid, respectively applying said first and second quantities of light to first and second photosensitive devices, whereby first and second electrical currents are respectively induced in said photosensitive devices, said first current comprising a relatively invarient component primarily due to the presence of said substance in said flame and a relatively rapidly fluctuating component primarily due to transient variations in the intensity of said flame, and said second current comprising a relatively invarient component primarily due to the presence of said internal standard in said flame and a relatively rapidly fluctuating component primarily due to transient variations in the intensity of said flame, impressing said electrical currents upon impedance means, detecting first and second electrical signals across at least a portion of said impedance means, driving a null-type current balancing recorder with said electrical signals, and adjusting the impedance of said impedance means to render the fluctuating components of said first and second electrical currents substantially equal to each other in the portion of said impedance means across which said electrical signals are detected.

2. A method of spectral-flame analysis of a liquid containing a substance and an internal standard as constituents thereof, said method comprising the steps of introducing said liquid into said flame, deriving a first quantity of light representative of the quantity of said substance in said liquid, deriving a second quantity of light representative of the qantity of said internal standard in said liquid, respectively applying said first and second quantities of light to first and second photosensitive devices, whereby first and second electrical currents are respectively induced in said photosensitive devices, said first current comprising a relatively invarient component primarily due to the presence of said substance in said flame and a relatively rapidly fluctuating component primarily due to transient variations in the intensity of said flame, and said second current comprising a relatively invarient component primarily due to the presence of said internal standard in said flame and a relatively rapidly fluctuating component primarily due to transient variations in the intensity of said flame, impressing said electrical currents upon impedance means which includes capacitance means, detecting first and second electrical signals across at least a portion of said impedance means, driving a null-type current balancing recorder with said electrical signals, and adjusting the capacitance means of said impedance means to render the fluctuating components of said first and second electrical currents substantially equal to each other in the portion of said impedance means across which said electrical signals are detected.

3. A method of spectral-flame analysis of a liquid containing a substance and an internal standard as constituents thereof, said method comprising the steps of introducing said liquid into said flame, deriving a first quantity of light representative of the quantity of said substance in said liquid, deriving a second quantity of light representative of the quantity of said internal standard in said liquid, respectively applying said first and second quantities of light to first and second photosensitive devices, whereby first and second electrical currents are respectively induced in said photosensitive devices, said first current comprising a relatively invarient component primarily due to the presence of said substance in said flame and a relatively rapidly fluctuating component primarily due to transient variations in the intensity of said flame, and said second current comprising a relatively invarient component primarily due to the presence of said internal standard in said flame and a relatively rapidly fluctuating component primarily due to transient variations in the intensity of said flame, impressing said electrical currents upon impedance means, detecting first and second electrical signals across at least a portion of said impedance means, driving a null-type current balancing recorder with said electrical signals, and adjusting the impedance of said impedance means to render thereacross the ratio of the fluctuating component to the invarient component of said first current substantially equal to the ratio of the fluctuating component to the invarient component of said second current.

4. A method of spectral-flame analysis of a liquid containing a substance and an internal standard as constituents thereof, said method comprising the steps of introducing said liquid into said flame, deriving a first quantity of light representative of the quantity of said substance in said liquid, deriving a second quantity of light representative of the quantity of said internal standard in said liquid, respectively applying said first and second quantities of light to first and second photosensitive devices, whereby first and second electrical currents are respectively induced in said photosensitive devices, said first current comprising a relatively invarient component primarily due to the presence of said substance in said flame and a relatively rapidly fluctuating component primarily due to transient variations in the intensity of said flame, and said second current comprising a relatively invarient component primarily due to the presence of said internal standard in said flame and a relatively rapidly fluctuating component primarily due to transient variations in the intensity of said flame, impressing said electrical currents upon impedance means including capacitance means, detecting first and second electrical signals across at least a portion of said impedance means, driving a null-type current balancing recorder with said electrical signals, and adjusting the capacitance of said impedance means to render thereacross the ratio of the fluctuating component to the invarient component of said first current substantially equal to the ratio of the fluctuating component to the invarient component of said second current.

5. Recording spectral-flame photometer apparatus for the spectral-flame analysis of a liquid containing a substance and an internal standard as constituents thereof, said apparatus comprising, in combination, a spectral-flame burner, means for introducing the constituents of said liquid into the flame of said burner, a first photosensitive device positioned with respect to said flame to receive the spectral light corresponding to said substance and thereby to generate a first current, said first current including a relatively invarient component primarily due to the presence of said substance in said flame and a relatively rapidly fluctuating component primarily due to transient variations in the intensity of said flame, a second photosensitive device positioned with respect to said flame to receive the spectral light corresponding to said internal standard and thereby to generate a second current, said second current including a relatively invarient component primarily due to the presence of said internal standard in said flame and a relatively rapidly fluctuating component primarily due to transient variations in the intensity of said flame, a null-type balance current ratio system having input and output means, means for coupling at least a portion of said first and second currents to said input means, a recorder connected to said output means and operative in accordance with the ratio of said first and second currents to produce a record, and adjustable impedance means included in said coupling means for rendering the fluctuating components of the portions of said first and second currents coupled to said recorder substantially equal to each other.

6. Recording spectral-flame photometer apparatus for the spectral-flame analysis of a liquid containing a substance and an internal standard as constituents thereof, said apparatus comprising, in combination, a spectral-flame burner, means for introducing the constituents of said liquid into the flame of said burner, a first photosensitive device positioned with respect to said flame to receive the spectral light corresponding to said substance and thereby to generate a first current, said first current including a relatively invarient component primarily due to the presence of said substance in said flame and a relatively rapidly fluctuating component primarily due to transient variations in the intensity of said flame, a second photosensitive device positioned with respect to said flame to receive the spectral light corresponding to said internal standard and thereby to generate a second current, said second current including a relatively invarient component primarily due to the presence of said internal standard in said flame and a relatively rapidly fluctuating component primarily due to transient variations in the intensity of said flame, a null-type balance current ratio system having input and output means, means for coupling at least a portion of said first and second currents to said input means, a recorder connected to said output means and operative in accordance with the ratio of said first and second currents to produce a record, and adjustable capacitance means included in said coupling means for rendering the fluctuating components of the portions of said first and second currents coupled to said recorder substantially equal to each other.

7. Recording spectral-flame photometer apparatus for the spectral-flame analysis of a liquid containing a substance and an internal standard as constituents thereof, said apparatus comprising, in combination, a spectral-flame burner, means for introducing the constituents of said liquid into the flame of said burner, a first photosensitive device positioned with respect to said flame to receive the spectral light corresponding to said substance and thereby to generate a first current, said first current including a relatively invarient component primarily due to the presence of said substance in said flame and a relatively rapidly fluctuating component primarily due to transient variations in the intensity of said flame, a second photosensitive device positioned with respect to said flame to receive the spectral light corresponding to said internal standard and thereby to generate a second current, said second current including a relatively invarient component primarily due to the presence of said internal standard in said flame and a relatively rapidly fluctuating component primarily due to transient variations in the intensity of said flame, a null-type balance current ratio system having input and output means, means for coupling at least a portion of said first and second currents to said input means, a recorder connected to said output means and operative in accordance with the ratio of said first and second currents to produce a record, and adjustable capacitance means included in said coupling means, the capacitance of said capacitance means being adjusted so that the ratio of the magnitude of said fluctuating component to said invarient component of said first and second currents are substantially equal to each other, thereby to prevent false peaks and depressions in said record.

8. Recording spectral-flame photometer apparatus for the spectral-flame analysis of a liquid containing a substance and an internal standard as constituents thereof, said apparatus comprising, in combination, a spectral-flame burner, means for introducing the constituents of said liquid into the flame of said burner, a first photosensitive device positioned with respect to said flame to receive the spectral light corresponding to said substance and thereby to generate a first current, said first current including a relatively invarient component primarily due to the presence of said substance in said flame and a relatively rapidly fluctuating component primarily due to transient variations in the intensity of said flame, a second photosensitive device positioned with respect to said flame to receive the spectral light corresponding to said internal standard and thereby to generate a second current, said second current including a relatively invarient component primarily due to the presence of said internal standard in said flame and a relatively rapidly fluctuating component primarily due to transient variations in the intensity of said flame, first and second impedance circuits each comprising a capacitor connected in parallel with a resistor, means for respectively coupling said first and second currents to said first and second impedance circuits, whereby first and second voltages are impressed across the resistors of said impedance circuits, means for varying the capacitance of at least one of said capacitors to a value at which the ratios of the fluctuating component to the invarient component of said first and second currents are substantially equal to each other, a comparator system including a motor, fixed means for selecting and coupling to said comparator at least a portion of the voltage impressed across the resistor of one of said impedance circuits, adjustable means for selecting and coupling to said comparator at least a portion of the voltage impressed across the resistor of the other one of said impedance circuits, said motor being mechanically coupled to said variable means such that the voltage selected by said adjustable means is varied in accordance with the voltage selected by said fixed means.

9. Recording spectral-flame photometer apparatus in accordance with claim 8 wherein thermal sensitive means are connected in circuit with said first and second photosensitive devices to neutralize the effect of ambient temperature variations thereon.

References Cited by the Examiner
UNITED STATES PATENTS

| | | | |
|---|---|---|---|
| 2,510,347 | 6/50 | Perkins | 88—14 |
| 2,664,779 | 1/54 | White | 88—14 |
| 2,678,401 | 5/54 | Jaeger | 250—209 |
| 2,809,295 | 10/57 | Reiffel | 250—209 |
| 2,909,669 | 10/59 | Jacobs | 88—23 |

JEWELL H. PEDERSEN, *Primary Examiner.*